United States Patent
MacKay et al.

(10) Patent No.: US 7,590,748 B2
(45) Date of Patent: Sep. 15, 2009

(54) LOCALIZATION OF RESOURCES USED BY APPLICATIONS IN HAND-HELD ELECTRONIC DEVICES AND METHODS THEREOF

(75) Inventors: Jon MacKay, Waterloo (CA); Matthew Bells, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1114 days.

(21) Appl. No.: 10/797,421

(22) Filed: Mar. 10, 2004

(65) Prior Publication Data

US 2005/0009538 A1    Jan. 13, 2005

Related U.S. Application Data

(60) Provisional application No. 60/453,510, filed on Mar. 12, 2003.

(30) Foreign Application Priority Data

Mar. 11, 2003    (CA) .................................... 2421656

(51) Int. Cl.
  *G06F 15/16*    (2006.01)
  *H04W 24/00*    (2006.01)
(52) U.S. Cl. ...................... 709/230; 709/203; 709/219; 455/456.1
(58) Field of Classification Search ....................... None
  See application file for complete search history.

(56) References Cited

U.S. PATENT DOCUMENTS 5,477,448 A * 12/1995 Golding et al. ................ 704/9
7,260,628 B2 * 8/2007 Yamamoto et al. ........... 709/224
2002/0162093 A1 * 10/2002 Zhou et al. .................... 717/130
2003/0046059 A1    3/2003 Litster et al.
2003/0046526 A1    3/2003 Zhang et al.
2003/0046527 A1    3/2003 Musuchenborn

FOREIGN PATENT DOCUMENTS

SE    0002317 A0    6/2000

OTHER PUBLICATIONS

CIPO: Office Action dated Jan. 4, 2005 in Canadian Application No. 2,421,656.
CIPO: Office Action dated Apr. 30, 2007 in Canadian Application No. 2,421,656.

* cited by examiner

*Primary Examiner*—John B. Walsh
(74) *Attorney, Agent, or Firm*—Jones Day; Krishna K. Pathiyal; Robert C. Liang

(57) ABSTRACT

Resource bundles are provided that contain localized resources that a handheld device can use to adapt an application to the current locale of the hand-held electronic device. The resource bundles can be stored in a remotely-located server and downloaded over a network to the hand-held electronic device on request. Alternatively, a hand-held device can store resource bundles for multiple locales and choose a resource bundle that is appropriate for its current locale. A resource bundle can be used to allow a hand-held device to automatically adapt an application to the current locale such as by identifying an entered character sequence that matches a predetermined sequence associated with the current locale of the hand-held device, choosing an article for use with a word that is grammatically correct for the language associated with the current locale, and automatically replacing the character sequence with the article.

18 Claims, 2 Drawing Sheets

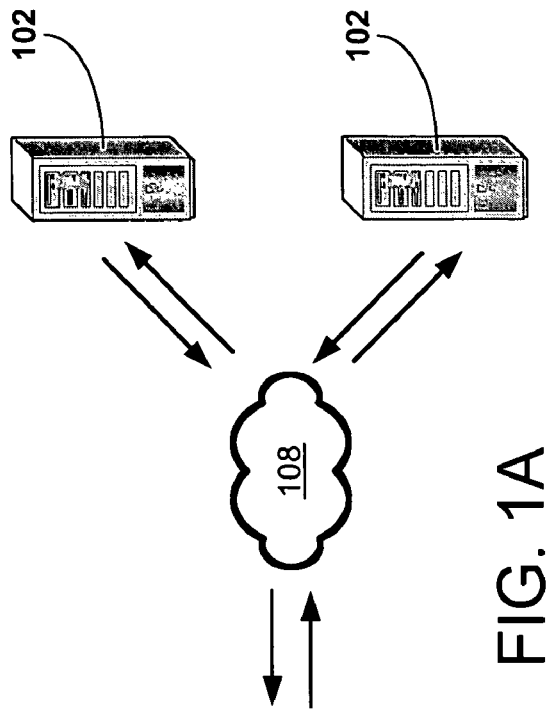
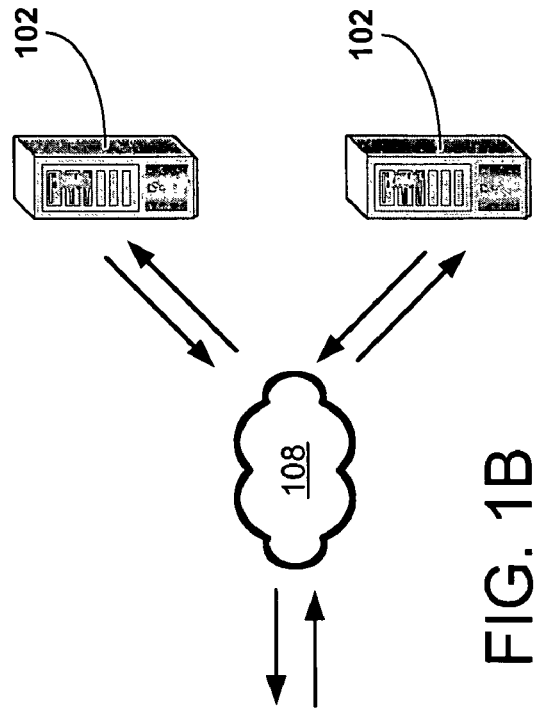
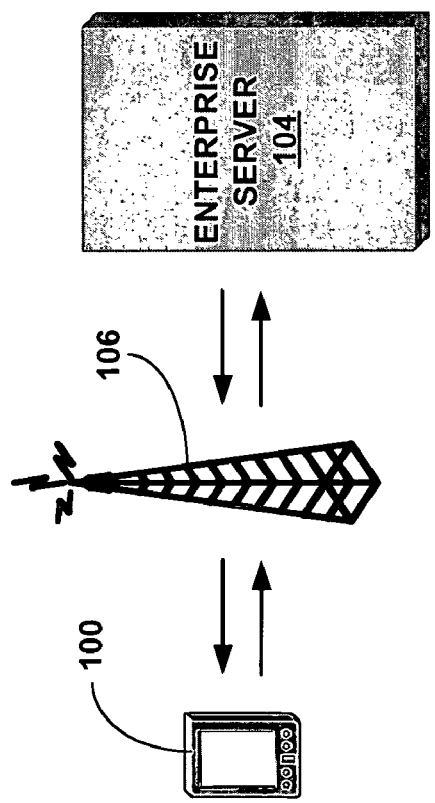
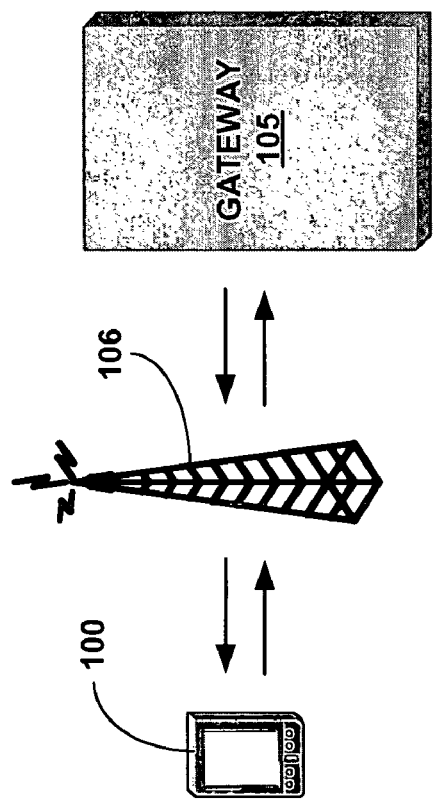
FIG. 1A
FIG. 1B

LOCALIZATION OF RESOURCES USED BY APPLICATIONS IN HAND-HELD ELECTRONIC DEVICES AND METHODS THEREOF

CROSS-REFERENCE TO RELATED APPLICATIONS

This application claims the benefit under 35 USC § 120 of U.S. Provisional Application No. 60/453,510 entitled "Localization Of Resources Used By Applications In Hand-Held Electronic Devices And Methods Thereof," which was filed on Mar. 12, 2003. The entire disclosure of U.S. Provisional Application No. 60/453,510 is hereby incorporated into the present application by reference. This application also claims the benefit under 35 USC § 119 of Canadian Patent Application No. 2,421,656 entitled "Localization Of Resources Used By Applications In Hand-Held Electronic Devices And Methods Thereof," which was filed on Mar. 11, 2003 and also incorporates Canadian Patent Application No. 2,421,656 into the present application by reference.

BACKGROUND

1. Field

The systems and methods described in this patent document relate generally to wireless communication and more specifically to wireless communication with mobile stations.

2. Description of the Related Art

Hand-held electronic devices typically have software applications installed on them. Many software applications can be localized for a specific location. For example, a personal information manager application may have an English language user interface for use in English speaking countries such as the U.S. and a French language user interface for use in French speaking countries such as Canada.

SUMMARY

A system and method are provided for localizing applications that are used with hand-held electronic devices.

BRIEF DESCRIPTION OF THE DRAWINGS

FIGS. 1A and 1B are block diagrams of exemplary network communication systems;

Figure 2:
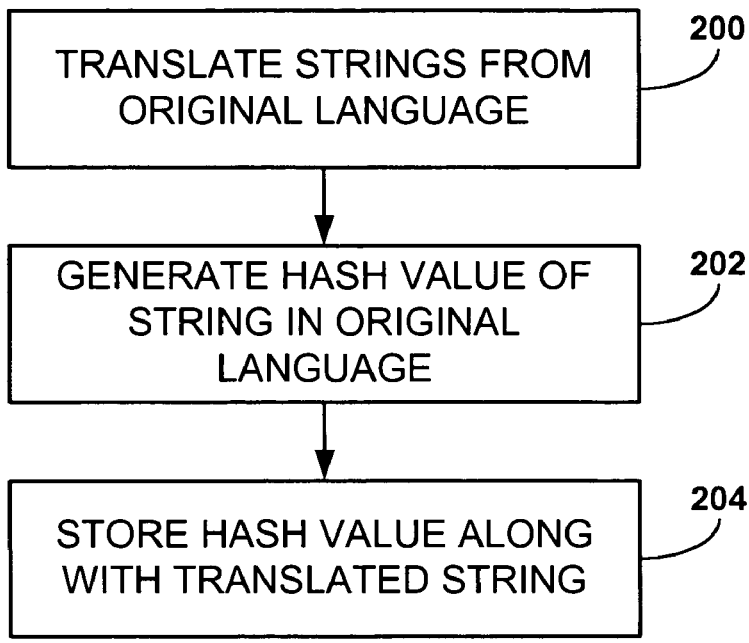
FIG. 2 is a flowchart of an exemplary method for generating and storing information relating to an original language string that may be translated into another language for localization purposes.

For simplicity and clarity of illustration, elements shown in the figures are not drawn to scale. Also, reference numerals that appear in multiple figures indicate that the exemplary systems illustrated in the figures may have corresponding or analogous elements.

DETAILED DESCRIPTION

Shown in FIGS. 1A and 1B are diagrams of exemplary network communication systems. The system shown in FIG. 1A comprises a hand-held electronic device 100, one or more origin servers 102, and an enterprise server 104. The hand-held electronic device 100 is coupled to the enterprise server 104 via a wireless network 106. The Enterprise server 104 is coupled to an origin server 102 via a local-area-network or wide-area-network 108, such as, but not limited to, an Intranet or the Internet.

The system shown in FIG. 1B comprises a hand-held electronic device 100, one or more origin servers 102, and a gateway 105. The Gateway 105 in this example is a direct Transmission Control Protocol (TCP) gateway or a Wireless Application Protocol (WAP) gateway, but could be some other type of gateway. The hand-held electronic device 100 is coupled to the gateway 105 via a wireless network 106. The Gateway 105 is coupled to an origin server 102 via a wide-area-network 108, such as, but not limited to, the Internet.

The hand-held electronic device 100 may be a personal data assistant (PDA), a personal information manager (PIM), a two-way pager, and the like. The hand-held electronic device 100 preferably has an operating system, a user-interface engine, and one or more specialized software applications, but other architectural configurations are possible.

The software applications preferably have user-interface capabilities that are implemented via a user-interface engine and that may be adaptable to specific locales. For example, the language of the user interface and the formatting of numbers, data, currency and percents may be locale-specific. In another example, the upper and lower casing of letters may be locale-specific. In a further example, the way a list is sorted or which day is the one in the left column of a calendar may be locale-specific.

Resource bundles are a convenient way to provide locale-specific resources for use by a software application. Resource bundles may comprise, for example, translated strings and formatting information. Resource bundles may also comprise any or all of images, string arrays, and lists of strings. For example, a list of strings may be defined as follows:
SAVE#0="Save";
CANCEL#0="Cancel";
DISCARD#0="Discard";
while an exemplary array of strings may be defined as follows:

```
CLOSE_OPTIONS#0={
    "Save",
        "Cancel",
        "Discard",
    };
```

When an application is installed on the hand-held electronic device 100, a default resource bundle and possibly some other resource bundles may be installed along with it. However, due to the limited storage and memory of hand-held electronic device 100, generally not all available resource bundles are installed for all applications on the device.

An origin server 102 may store resource bundles for various applications and various locales. For example, each resource bundle may be located by a universal resource locator (URL) of the form:
"protocol://address/vendor/product/version/locale.resource"

For example, the origin server 102 may store the following resource bundles:
http://languages.rim.net/rim/BlackBerryApps/3.6.0/en_CA.rb
http://languages.rim.net/rim/BlackBerryApps/3.6.0/fr_CA.rb
http://languages.rim.net/rim/BlackBerryApps/3.6.0/en_US.rb http://languages.rim.net/rim/BlackBerryApps/3.6.0/es_US.rb
http://languages.rim.net/rim/BlackBerryBrowser/3.6.0/en_CA.rb
http://languages.rim.net/rim/BlackBerryBrowser/3.6.0/fr_CA.rb
http://languages.rim.net/rim/BlackBerryBrowser/3.6.0/en_US.rb where, in this example, the protocol is "http" (although any other suitable protocol may be used), the address is "languages.rim.net", which is an example of the address of origin server 102, the vendor is "rim", the version is "3.6.0", and the locales are, in this example, as specified by Java convention. Resource bundles from different vendors may be stored on the same server.

The resource bundles may take any suitable form. For example, the resource bundles may be in the form of an uncompressed text file, or in the form of a compressed binary object, where any suitable compression algorithm or algorithms have been applied. Compressed resource bundles will require less download time for a given bandwidth than uncompressed resource bundles.

Each application for which locale-specific resource bundles are stored may contain a configuration string that indicates where the resource bundles may be found. For example, resource bundles for third-party applications may be stored on a server operated by the third party or, as described above, on a server along with applications from other parties.

If a user of a hand-held electronic device 100 wants to operate a particular application in a locale-specific manner for a particular locale and the appropriate resource bundle is not currently installed on the device, the user may instruct the hand-held electronic device 100 to download the desired resource bundle over the wireless network 106. The user has the option of selecting a particular locale, and the hand-held electronic device 100 will automatically download resource bundles for that locale for each application installed on the device 100, if available. The user has a number of options available for viewing resource bundles. For example, the user may view all available resource bundles by having the device 100 access the URL "protocol://address/", or all available resource bundles for a particular application by having the device 100 access the URL "protocol://address/vendor/product/", or all available resource bundles for a particular version of a particular application, by having the device 100 access the URL "protocol://address/vendor/product/version/".

Similarly, fonts to properly display the language (e.g. currency symbols) or other locale-specific resources used in a resource bundle may be downloaded by the device 100 over the wireless network 106 from a server.

The ability to selectively and dynamically download resource bundles for applications over a wireless network can serve many purposes. For example, a Canadian resident user may travel to Switzerland for a short business trip, taking her hand-held electronic device along with her. Resource bundles for the locales en_CA and/or fr_CA may already be stored on the device, with one of the resource bundles serving as the default. While in Switzerland, she may wish to enable a German speaker to use the hand-held electronic device. She may download the resource bundles for the locale de_CH, which corresponds to the German language in Switzerland, for one or more applications installed on the device. The resource bundles will be downloaded over a wireless network, so that the user is not required to download the resource bundles to a computer and then sync the hand-held electronic device to the computer. Once her business trip is completed, the user may delete the resource bundles for the locale de_CH from her device to free up device storage and memory.

Resource bundles may be grouped into families according to their application. If a resource bundle family for a particular application is installed on a hand-held electronic device 100, the application may switch between resource bundles without having to load new resource bundles. One way of implementing this is to have the application make its entire resource bundle family available for use and access the appropriate reference bundle from within the family on-the-fly by selecting for use the resource bundle for the current locale that is selected by the user. For example, an application's user-interface components may have as inputs for selecting a localized string both a resource bundle family identifier and an identifier for the specific string within the resource family bundle to be accessed. The application will choose the specific string by choosing the string that corresponds to the user selected current locale. Thus, the applications are not required to monitor for an event that indicates a current locale change, but, instead the application changes when the user signals to the application that the current locale has changed. Consequently, when the locale changes, the application will start displaying information in a manner appropriate for the new locale, without requiring the application to restart.

The hand-held electronic device 100 may store resource bundles or a resource bundle family comprising locale-specific translations of common user-interface resources. For example, translations of common user interface resources such as "Open", "Close", "OK", "Cancel", may be stored. This can be helpful when a current local resource bundle is not available for use with an application. In this situation, the application can automatically replace the common user-interface resources with the local specific translations of the common user-interface resources in the appropriate resource bundle. This allows at least a portion of the application's user-interface resources to appear in the appropriate language for the current locale.

As compared to Java which encodes a locale as an object with 3 strings and that consumes at least 132 bytes of storage and may result in slow comparisons, the language and country of a locale can be encoded together as a 4-byte integer. The variant may also be encoded as a 4-byte integer as well, so that a single locale may require no more than 8 bytes for storage. This allows a processor of the hand-held device 100 to perform a comparison using an int or long comparison instruction. In addition, mapping each byte onto an ASCII value may enhance debugging.

The hand-held electronic device 100 may also comprise an AutoText engine, which is a software application that extends the user interface by making use of one or more databases to perform text insertions and other related activities. In addition to a standard AutoText database comprising entries of "original string" and associated "replacement strings" pairs, an additional database comprising locale-specific entries could be stored on the hand-held electronic device 100. A user of the hand-held electronic device 100 may subscribe to a number of databases whose changes could be pushed to the device over wireless network 106.

For example, a health professional may subscribe to a database whose entries include, for example, some or all of the following pairs: ("cpe", "complete physical examination"); ("bp", "blood pressure"); ("cv", "cardiovascular"); ("fh", "family history"); ("infln", "inflammation"); etc. In another example, a legal professional may subscribe to a database whose entries include, for example, some or all of the following pairs: ("cpas", "contract of purchase and sale");

("def", "defendant"); ("pla", "plaintiff"); ("sol", "solicitor"); ("priv", "privileged"); etc. Similarly, a company whose employees use hand-held electronic devices such as hand-held electronic device 100 may provide a database to employees whose entries include shortcuts of terminology related to the company's business. Changes to the company-specific database could be pushed to the devices over wireless network 106. For example, a database for Research In Motion employees may include some or all of the following pairs: ("bb", "BlackBerry"); ("cdma", "CDMA"); ("rim", "RIM"); ("rimo", "Research In Motion"); etc.

Since a locale can indicate not only a country and a language, but also a variant, a locale may be used to indicate the profession or industry or company to which the user belongs, thus identifying which databases are of interest.

The AutoText engine, or alternatively a separate software application, may be able to implement an AutoArticle functionality. The user of a hand-held electronic device 100 may enter a special character sequence (defined on a per-language basis) that triggers a dictionary and/or grammar lookup to determine whether a word of interest is masculine, feminine, plural, etc. This feature may be useful, for example, in a language such as French, Italian, or Danish.

In an auto-correct mode, articles may be inserted or corrected automatically as they are entered by the user. The user may use a special character sequence (defined on a per-language basis) to indicate that the article should be automatically inserted. For example, "ll lune" would become "la lune" while "ll soleil" would become "le soleil". "ll bureaux" would become "les bureaux", and "uu bureau" would become "un bureau". Alternatively, instead of having the user enter a special character sequence, in auto-correct mode an incorrect article would be automatically corrected. For example, "le lune" would be automatically corrected to "la lune". If the AutoText engine were unable to determine the article of a word, a dialog box may appear to enable the user to choose the article to use.

The AutoText engine, or alternatively a separate software application, may be able to implement an AutoQuote functionality. For example, a user of hand-held electronic device 100 may enter a quote character. If the quote character is preceded by an empty or whitespace, then the quote character would be replaced with an open-quote character. Otherwise, the quote character would be replaced with a close-quote character. The open-quote character and close-quote character may be locale-specific. For example, when the current locale of the hand-held electronic device 100 includes the French language, the open- and close-quote characters may be guimets (<< and >>, respectively). In another example, when the current locale of the hand-held electronic device 100 includes the German language, the open- and close-quote characters may be guimets, or the open-quote character may be a lower quote (") and the close-quote character may be an upper quote (").

To facilitate the localization of applications developed for electronic devices, such as the hand-held electronic device 100, certain features may be incorporated into a development environment. One such feature is a system for determining whether a specific translation of a user-interface components is the translation for the most recent version of the user-interface components or a translation of an earlier version. This system can be implemented by including in the original language string's additional related information.

FIG. 2 is a flowchart of an exemplary method for generating and storing this additional information. One or more strings in an original language may be translated into a different language (Step 200). A code such as a hash value may be generated for each string in the original language by using a coding method such as the hash code method (Step 202). The code value may be stored along with the translated string (Step 204). The code value for a particular input should be statistically unique as it is with a hash value for a particular input.

Figure 3:
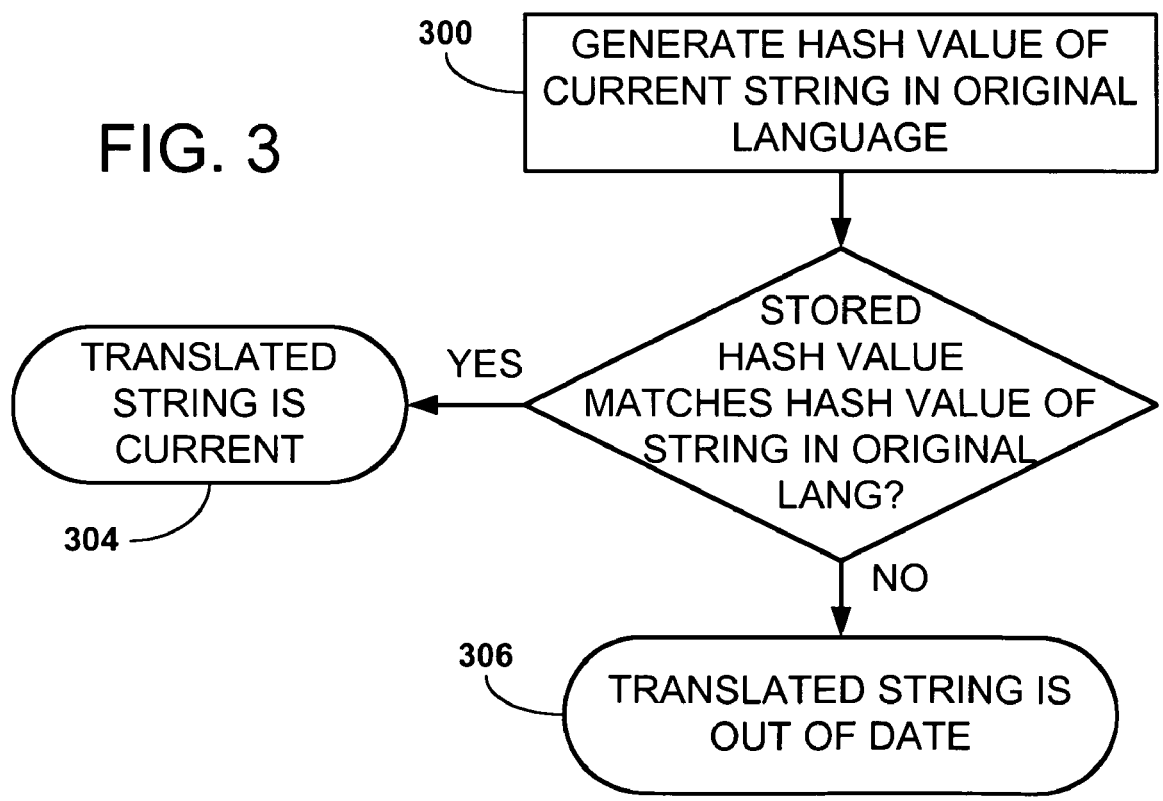
FIG. 3 is a flowchart of an exemplary method for determining whether a translated string is out of date.

During development of an application, a string in an original language may be changed after having been translated. FIG. 3 is a flowchart of an exemplary method for determining whether a translation of a string is out of date. A code such as a hash value of the current string in the original language may be generated using the same coding method described above (Step 300). This newly generated code may be compared to the code stored with the translated string (Step 302). If the codes match, then in all likelihood, the string in the original language has not changed since the translation was done, and the translated string is current (Step 304). If the codes do not match, then the translated string is out of date (Step 306). A viewer or editor application in the development environment may then visually indicate which information is current and which is not.

Another feature that may be incorporated into the development environment is a system for providing a resource bundle diagnostic tool. An exemplary system may include a resource bundle that may be defined using at least two separate files: a resource header file, that lists keys for each localized resource in the resource bundle, and a resource content file, that lists the keys and their localized resource values. A resource bundle diagnostic tool in the exemplary system may perform any or all of the following operations:

I. Validation Operations a) checking for missing resources, by identifying keys listed in the resource header file that have no corresponding entry in the corresponding resource content file;

b) checking for empty resources, by identifying keys listed in the resource header whose corresponding entry in the corresponding resource content file has no localized resource value defined;

c) checking for undeclared resources, by identifying resources listed in the resource content file but whose key has not been listed in the resource header file;

d) checking for out-of-date resources as described above;

e) verifying that the original resource value and the localized resource value have the same format, for example, "name:" has been translated to "nom:", and the space after the colon has been included in the translated string;

f) checking that the display width of the resources (which may depend upon the widths of characters in a particular font) do not exceed the predefined display width of the screen of the hand-held electronic device;

g) validating hotkeys (used to quickly access different applications on the hand-held electronic device) to ensure that in a particular locale, the same hotkey is not assigned to more than one function, and to ensure that the hotkey is an allowed length;

II. Statistical operations—generating statistics for the number of new resources present, which may, for example, be used by the developer to gauge how much work still needs to be done; and III. Searching for unused resources—identifying resources listed in the resource header file and resource content file, but not called by the application.

Software development is often tracked using a source code control system. As developers write software code, various branches are made for different releases to customers, so that developers can write new, untested code at the same time that a branch is being tested and stabilized for release. Since different branches of software code may have many resources in common, it is generally not feasible for the resources of each branch to be translated separately.

Another feature that may be incorporated into the development environment is a system having a resource "database" tool. For example, the tool may generate from resource files of a particular branch of code of a software application a resource "database". The "database", which may be a flat file or any other format for storing the information, may contain an identifier of a resource, for example, CLOSE#0, its value in various locales, for example, "Close" in the locale "en", "Ferme" in the locale "fr", the hash value of the resource value in its original language, as described herein above, and the name of the resource file(s) for these resources. Optionally, other information may be included in the "database", and/or not all of the above-listed information may be included in the "database".

The tool may enable a software developer or integrator to copy the resource "database" to another branch of code of the software application. If this other branch of the software application does not yet comprise localized resource files, the tool may then enable the creation of localized resource files comprising the resources whose information is stored in the copied resource "database". The validation tools described herein above may then be used to determine whether translations of resources appearing in this branch are up to date or missing. Only those localized resources which are missing or out of date will then be marked for translation, rather than requiring all the resources for this branch to be translated.

Alternatively, this branch of the software application may already comprise resource files, and the tool may use the copied resource "database" to update translated resources when the hash value in the copied resource "database" does not match the hash value in this branch's resource files, and to complete missing resource values in this branch's resource files. Only those localized resources which are still missing or still out of date will then be marked for translation, rather than requiring all the resources for this branch to be translated.

The format of resources in a resource bundle may enable strings to display one of a predefined set of string options by matching the options with attributes in a text. This type of format may have several uses, only one of which will be described here for clarity. Moreover, although only one type of format is shown in the following examples, alternate formats that enable strings to display one of a predefined set of string options by matching the options with attributes in text may be used instead.

For example, the format may be used to match gender. The phrase "Repeats every {0}", where {0} is replaced with either "week" or "month" will be translated in French to "Répète toutes les semaines" or "Répète tous les mois". Depending on the gender of the insertion, the second word of the French phrase is different. For example, the translated phrase may use the following format:

"Répète {0,choiceattrib,m#tous|f#toutes}les {0}"

thus associating "tous" with the attribute "m" and "toutes" with the attribute "f", and the insertions may be "semaines\0f" and "mois\0m", thus giving "semaines" the attribute "f" and giving "mois" the attribute "m". Then the user interface of the hand-held electronic device may be extended to test the insertions for the attribute and to select the string associated with the attribute of the insertion.

The structural arrangements and steps described herein and shown in the drawings are examples of structures, systems, or methods having elements or steps corresponding to the elements or steps of the invention recited in the claims. This written description and drawings may enable those skilled in the art to make and use embodiments having alternative elements or steps that likewise correspond to the elements or steps of the invention recited in the claims. The intended scope of the invention thus includes other structures, systems, or methods that do not differ from the literal language of the claims, and further includes other structures, systems, or methods with insubstantial differences from the literal language of the claims.

We claim:

1. A method of operation in a hand-held electronic device comprising the following steps:

establishing a wireless connection between the hand-held wireless device and an enterprise server or gateway in a wireless network, wherein the wireless network comprises the enterprise server or gateway and wherein the enterprise server or gateway is connected via a communication path to a remotely located origin server that stores resource bundles containing localized resources that can be used with one or more applications on the hand-held electronic device;

requesting from the enterprise server or gateway localized resources for use with an application on the hand-held electronic device, wherein the localized resources are related to a current locale of the hand-held wireless device and wherein the enterprise server or gateway requests the localized resources from the remotely located origin server and the origin server transmits a resource bundle containing localized resources to the enterprise server or gateway;

receiving via the wireless connection a resource bundle from the enterprise server or gateway that comprises at least some of the requested localized resources;

identifying a character sequence entered by a user of the hand-held electronic device that matches a predetermined sequence associated with the current locale of the hand-held device;

choosing an article for use with a word that is entered by the user after the character sequence is entered, wherein the article is grammatically correct for the language associated with the current locale; and automatically replacing the character sequence with the article.

2. The method according to claim 1 wherein the hand-held electronic device requests localized resources in response to receiving an indication that the locale has changed.

3. The method according to claim 2 wherein the indication is received via a user's input.

4. The method according to claim 1 wherein the hand-held electronic device requests localized resources in response to a user's input.

5. The method according to claim 1 wherein the resource bundle includes one or more types of character fonts.

6. The method according to claim 1 further comprising the following step:

receiving via the wireless connection a list of the contents of the resource bundle.

7. The method according to claim 1 wherein the receiving step comprises receiving resource bundle that comprises localized resources for a plurality of applications installed on the hand-held electronic device.

8. The method according to claim 7 wherein at least two of the plurality of applications are from different vendors.

9. The method of claim 8 wherein the localized resources for the at least two of the plurality of applications from different vendors are stored on a common server on the wireless network.

10. The method of claim 1 wherein the resource bundle includes localized resources for more than one locale.

11. A method of operation in a wireless network that provides services for hand-held electronic devices comprising the following steps:
- providing a communication channel for use by a hand-held electronic device in establishing a wireless connection between the hand-held wireless device and an enterprise server or gateway in a wireless network, wherein the wireless network comprises the enterprise server or gateway and wherein the enterprise server or gateway is connected via a communication path to a remotely located origin server that stores resource bundles containing localized resources that can be used with one or more applications on the hand-held electronic device;
- receiving a request for localized resources from the hand-held electronic device, wherein the localized resources are related to a current locale of the hand-held wireless device and wherein the enterprise server or gateway requests the localized resources from the remotely located origin server and the origin server transmits a resource bundle containing localized resources to the enterprise server or gateway; and
- transmitting to the hand-held electronic device via the wireless connection a resource bundle from the enterprise server or gateway that comprises at least some of the requested localized resources,
- wherein with use of the resource bundle, the hand-held electronic device can identify a character sequence entered by a user of the hand-held electronic device that matches a predetermined sequence associated with the current locale of the hand-held device, choose an article for use with a word that is entered by the user after the character sequence is entered, wherein the article is grammatically correct for the language associated with the current locale, and automatically replace the character sequence with the article.

12. The method according to claim 11 wherein the localized resources include information for more than one locale.

13. The method according to claim 11 wherein the localized resources include one or more types of character fonts.

14. The method according to claim 11 wherein a plurality of the applications are installed on the hand-held electronic device and wherein at least two of the plurality of applications are from different vendors.

15. A method of operating a wireless network comprising the steps of:
- providing a communication channel for use by a hand-held electronic device in establishing a wireless connection between the hand-held wireless device and an enterprise server or gateway in a wireless network, wherein the wireless network comprises the enterprise server or gateway and wherein the enterprise server or gateway is connected via a communication path to a remotely located origin server that stores resource bundles containing localized resources that can be used with one or more applications on the hand-held electronic device;
- receiving a request for localized resources from the hand-held electronic device, wherein the localized resources are related to a current locale of the hand-held wireless device and wherein the enterprise server or gateway requests the localized resources from the remotely located origin server and the origin server transmits a resource bundle containing localized resources to the enterprise server or gateway; and
- transmitting to the hand-held electronic device via the wireless connection a resource bundle from the enterprise server or gateway that comprises at least some of the requested localized resources,
- wherein with use of the resource bundle, the hand-held electronic device can determine that the usage of an article associated with a word is grammatically incorrect in the current locale of the hand-held device after a user of the hand-held electronic device enters a sequence of characters that includes the article and the word and wherein the hand-held electronic device automatically replaces the incorrectly used article with a grammatically correct article for the current locale.

16. The method according to claim 15 wherein the localized resources include information for more than one locale.

17. The method according to claim 15 wherein the localized resources include one or more types of character fonts.

18. The method according to claim 15 wherein a plurality of the applications are installed on the hand-held electronic device and wherein at least two of the plurality of applications are from different vendors.

* * * * *

UNITED STATES PATENT AND TRADEMARK OFFICE
CERTIFICATE OF CORRECTION

| | | |
|---|---|---|
| PATENT NO. | : 7,590,748 B2 | Page 1 of 1 |
| APPLICATION NO. | : 10/797421 | |
| DATED | : September 15, 2009 | |
| INVENTOR(S) | : MacKay et al. | |

It is certified that error appears in the above-identified patent and that said Letters Patent is hereby corrected as shown below:

Column 9, line 40, please replace "according to 11" with -- according to claim 11 --

Signed and Sealed this
Eighth Day of February, 2011

David J. Kappos
*Director of the United States Patent and Trademark Office*